(12) United States Patent
Lovett

(10) Patent No.: US 10,510,066 B2
(45) Date of Patent: Dec. 17, 2019

(54) ATM REPLACEMENT USING TWO MOBILE DEVICES

(71) Applicant: Robert R. Lovett, Finger, TN (US)

(72) Inventor: Robert R. Lovett, Finger, TN (US)

(*) Notice: Subject to any disclaimer, the term of this patent is extended or adjusted under 35 U.S.C. 154(b) by 0 days.

(21) Appl. No.: 16/371,094

(22) Filed: Mar. 31, 2019

(65) Prior Publication Data

US 2019/0340599 A1 Nov. 7, 2019

Related U.S. Application Data

(60) Provisional application No. 62/762,351, filed on May 1, 2018.

(51) Int. Cl.
| | |
|---|---|
| *G06Q 20/32* | (2012.01) |
| *G06Q 20/02* | (2012.01) |
| *H04W 4/029* | (2018.01) |
| *G06Q 20/42* | (2012.01) |
| *H04L 29/06* | (2006.01) |
| *G06Q 20/38* | (2012.01) |

(52) U.S. Cl.
CPC ....... *G06Q 20/3223* (2013.01); *G06Q 20/027* (2013.01); *G06Q 20/3224* (2013.01); *G06Q 20/385* (2013.01); *G06Q 20/42* (2013.01); *H04L 63/0846* (2013.01); *H04L 63/126* (2013.01); *H04W 4/029* (2018.02)

(58) Field of Classification Search
CPC ...... G06Q 20/20; G06Q 20/322; G06Q 20/40; G06Q 20/3224; G06Q 20/32
See application file for complete search history.

(56) References Cited

U.S. PATENT DOCUMENTS

| | | | |
|---|---|---|---|
| 9,715,689 B1* | 7/2017 | Ellis | G06Q 20/367 |
| 2008/0301461 A1* | 12/2008 | Coulier | G06F 21/31 |
| | | | 713/184 |
| 2010/0057579 A1 | 3/2010 | Tan | |
| 2013/0031009 A1 | 1/2013 | Kapoor et al. | |
| 2014/0108249 A1* | 4/2014 | Kulpati | G06Q 20/3223 |
| | | | 705/44 |
| 2016/0071110 A1 | 3/2016 | Lazay | |
| 2017/0162004 A1* | 6/2017 | Hughes | G07F 19/203 |

OTHER PUBLICATIONS

RTM-KAL, web pages downloaded Mar. 21, 2019.

* cited by examiner

*Primary Examiner* — Hao Fu
(74) *Attorney, Agent, or Firm* — James Richards

(57) ABSTRACT

A system, method, and program product for exchanging physical, virtual or fiat currency between two individuals at the same geographic location using account information stored on a server database. The payer activates payer mobile device using biometric identification, then inputs the amount to transfer along with a payee security code, then payer presses "send." The payee activates payee mobile device using a biometric identification, then payee inputs the amount to receive along with a payer security code then payee presses "send". Both the payer and the payee mobile devices simultaneously receive from the server an alphanumeric transaction code along with the amount. Transaction code and amount are displayed on the respective mobile screens. When payee verifies that both mobile devices display the same transaction code and dollar amount, then the payee presses "I Agree" key on payee mobile device. Then the funds are exchanged at the server database. Payer and payee may also exchange corresponding cash.

15 Claims, 14 Drawing Sheets

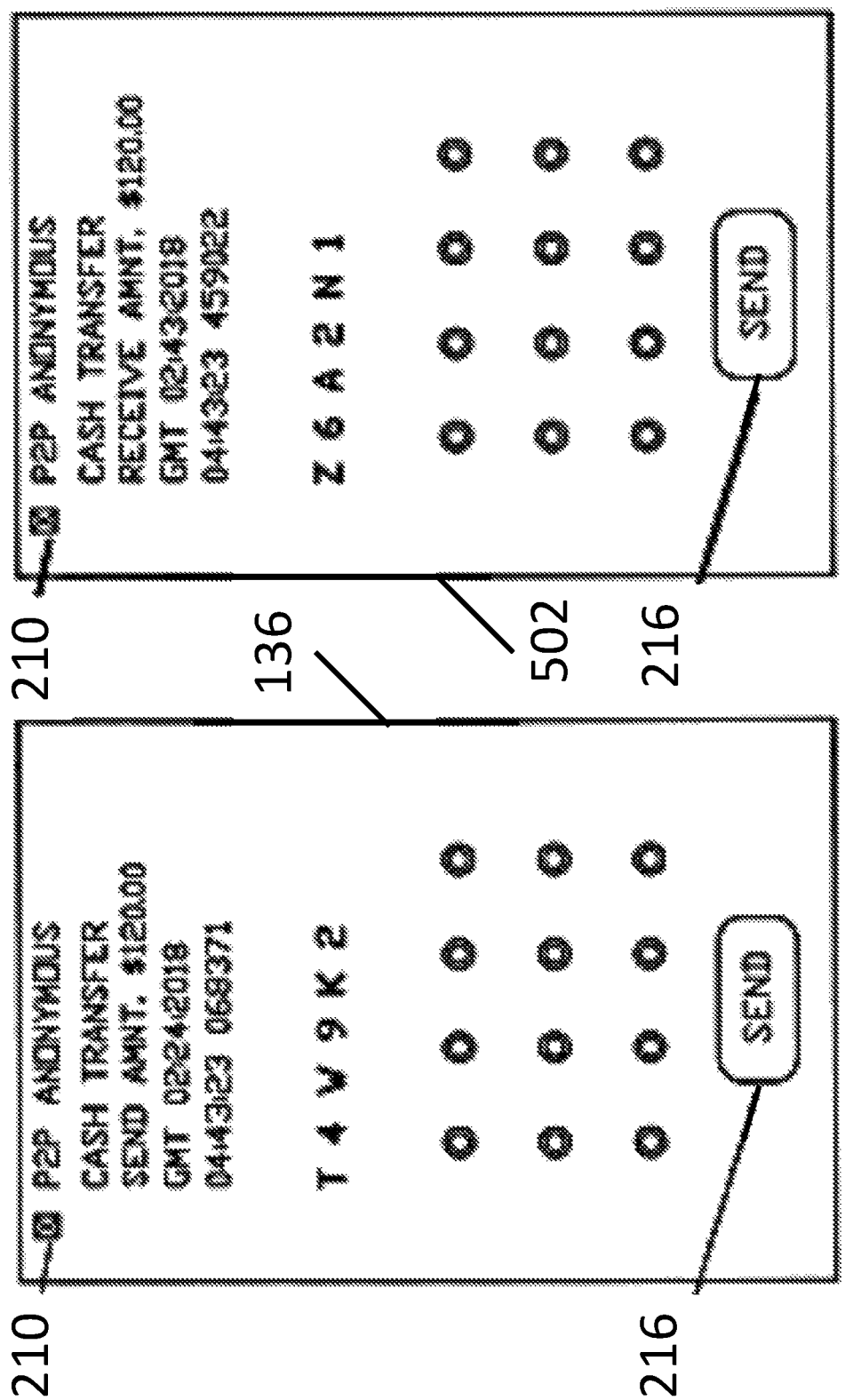

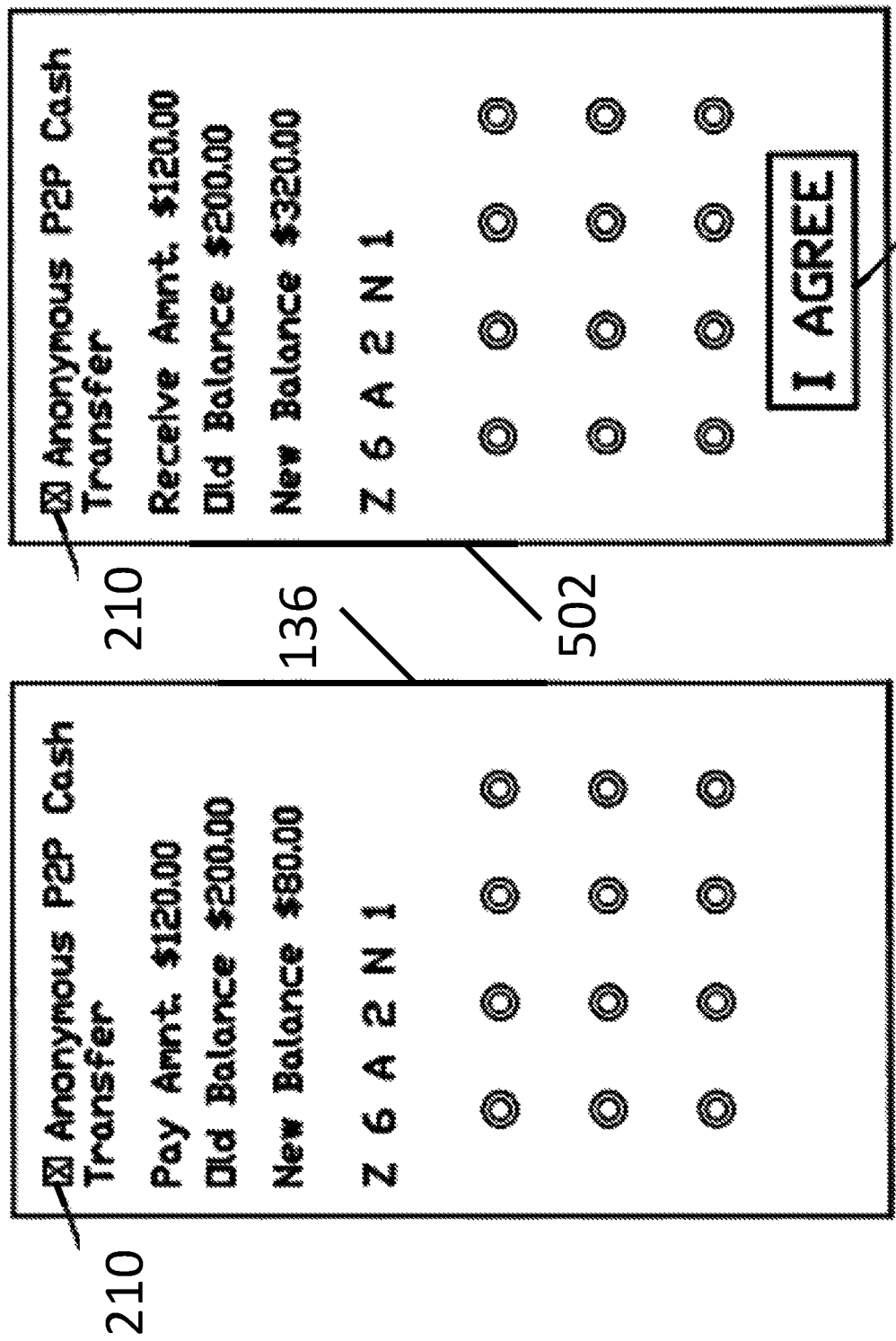

ATM REPLACEMENT USING TWO MOBILE DEVICES

RELATED APPLICATIONS

This application claims the benefit under 35 USC 119(e) of provisional application Ser. No. 62/762,351, titled "Merchant Escrow Account", filed May 1, 2018, by Lovett.

All of the above listed US patent and patent applications are hereby incorporated herein by reference in their entirety.

BACKGROUND

Technical Field

The present invention relates generally to the field of currency transactions, more particularly to the physical exchange or payment by paper currency by two individuals at the same geography location.

Background

Mobile financial payments are becoming increasingly popular because of speed, security, and ease of use. Mobile payments traditionally require some type of banking such as credit/debit cards or checking/savings account. There are perhaps two billion unbanked shoppers who do not have the financial resources to open a bank account, or don't qualify for any type of credit/debit cards. What is needed is a system for providing an alternative payment method for those who don't have the resources or otherwise choose to remain anonymous.

Eighty-five percent of all transactions globally, and 40 percent in the United States are still carried out using cash. Eighty percent of millennials still use cash and they are four times more likely to pay with greenbacks than mobile app.

One exemplary bank, which appears to boast a network of more than 16,300 ATMs and 5,300 branches across the country, reports its teller transactions decline 25% between 2014 and 2016. Customers used ATMs for 90% of withdrawals and 60% of deposits, though they still exclusively cashed checks with tellers.

There are currently three million Automated Teller Machines (ATMs) globally with a projection of four million by 2020.

The card issuers typically prohibit merchants from giving cash back on credit cards although some allow cash back on debits cards with some restrictions. However, merchants may suffer a loss when customer later files a charge back on the purchase item itself, and card holder's bank account may be compromised.

There are two billion unbanked shoppers globally who either do not have the financial resources or Millennials who choose not to have a bank account because of high overdraft fees and security concerns.

The cost to design, fabricate, ship, site rental, install, fill with cash weekly, allow for fraud, pilfering, maintain & replace, may far exceeds the value of an ATM in many locations.

BRIEF DESCRIPTION

Briefly the present invention relates to a system, method, and program product for exchanging physical, virtual or fiat currency between two individuals at the same geographic location using account information stored on a server database. The payer activates payer mobile device using biometric identification, then inputs the amount to transfer along with a payee security code, then payer presses "send." The payee activates payee mobile device using a biometric identification, then payee inputs the amount to receive along with a payer security code then payee presses "send". Both the payer and the payee mobile devices simultaneously receive from the server a randomly generated alphanumeric transaction code along with the amount. Transaction code and amount are displayed on the respective mobile screens. When payee verifies that both mobile devices display the same transaction code and dollar amount, then the payee presses "I Agree" key on payee mobile device. Then the funds are exchanged at the server database. Payer and payee may also exchange corresponding cash. Both mobile devices are updated in real time, and the remaining amount in each account is displayed on each respective mobile display for both parties to agree before departing.

In one variation, position determination of the user is used as a security factor in the transaction. A position determining capability in the user mobile device returns position information of the user mobile device to the consortium server to validate that the merchant and user are in close proximity. Merchant location may be predetermined or may be found by the merchant mobile device returning position information to the consortium server. Since the merchant and user must be in close proximity to hand over cash, a finding of a great distance between the two would indicate a possible fraud and would terminate the transaction. Position information may be from GPS, Wi-Fi, Cell phone data or other mechanisms. Permanent merchant locations may be entered manually from map or survey data.

Automated Teller Machines (ATM) are widely available in and around large cities but remain inaccessible to the less fortunate who do not have the sufficient funds to qualify for a checking or credit/debit card account required to withdraw funds from ATM. Personal security remains a concern for those who qualify for ATM accounts since the TV and newspaper headlines are filled with stories of robbery and death at ATM withdrawal locations globally. Further, ATM's are noted for malicious credit card skimmer devices, which capture card numbers and security code that allow hackers to drain bank accounts.

The computing device may include biometric information required to access the account information. The randomly generated alphanumeric code is used only one time and is valid for a short period of time. The present invention overcomes some of the hazards of visiting an ATM such as fraud or robbery.

In one embodiment, a Merchant Consortium may be organized to coordinate and manage the transactions. The merchant consortium may be a global bank or other financial institution. The consortium may operate a database containing the user's and merchant's accounts and record transactions. The consortium may operate a server to communicate with user's mobile devices and merchant's mobile and point of sale (POS) devices. Members may join the consortium and set up an account to enable transfer of funds among members. In particular, the system can enable a merchant member to act as an automatic teller machine for a merchant customer (also referred to as a user), i.e. handling cash withdraw and deposit for a merchant customer to the merchant customer's account with the consortium.

Banks may join the consortium to avoid the high cost of deploying and maintaining an ATM. The bank customers who are also consortium members may gain access for deposit of cash and withdrawal of cash in the bank customer's bank account through the consortium connections to the bank and merchant.

Merchant's may join because the fees may be much less than credit card fees and the convenience may attract new customers to the merchant.

Individuals may join because of the low or nonexistent withdrawal fee and the potentially world-wide availability of merchant members. Further, the inside location of the merchant's point of sale counter may have significant safety advantages compared with a poorly lit dark parking lot ATM at night. Individual's may also receive benefits from merchants who pass on some of the savings from the absence of credit card fees.

In one embodiment, the system includes a user account held at a banking service subscribed to by the merchant, for example, the merchant consortium. The user may contact the banking service using an application on the user's smart phone or other device. The user application communicates with the banking service using an encrypted and secure connection over the cell phone network. The application sends user ID information, transaction amount, type of transaction (deposit, withdraw, peer to peer transfer) and location information sufficient to identify the merchant. The merchant also contacts the banking service using a merchant smart phone or other device having a merchant application. The merchant application sends a customer, transaction amount, and other information as desired. The banking service then verifies that the user location information is consistent with being in proximity to the desired merchant and generates and sends a temporary code to the customer device and merchant device. The code is preferably a randomly generated short code easily verified by the customer and merchant, preferably ten digits or less, preferably less than six digits, for example a four digit code. Any length may be used. Numeric and alpha or other characters may be used. The same code is then displayed by the user device and the merchant device. The merchant may observe both devices to verify the displayed codes are the same. The code is preferably a one time use on a single transaction and temporary and usable for a predefined short period of time, preferably less than or equal to thirty minutes, more preferably less than or equal to ten minutes, or other time period as desired. The merchant device and user device are brought within close enough proximity so that the user or merchant or both may observe both displays to confirm the information is identical on both displays, in particular that the displayed code is identical on both displays. Thus, the merchant and user should be within one meter, preferably within three meters of one another to validate the codes. Once the merchant and/or user verify the displayed information including the code, the amount and the merchant and user, the merchant may press a transaction key, which may be labeled "I agree" or other label as desired, to activate and complete the transaction. The key press is then communicated by the APP to the banking server to update the account information.

If the transaction is a user deposit in the banking service account, the merchant will receive the cash from the user, the merchant's account will be debited and the user's account with the banking service will be credited. If the transaction is a withdrawal, the user account will be debited, the merchant account will be credited with the amount and the merchant will give the cash to the user. Thus, the system may provide a service similar to an automatic teller machine (ATM) using the checkout counter at the merchant.

In a further embodiment, the location information may utilize the Global Positioning System (GPS) feature available in many cell phones and smart devices. Other satellite positioning systems may also be used. Wi-Fi and other systems may also play a role in position determination. As a factor in the transaction security, the banking system server may compare the location information provided by the user computing device with the location of the merchant to validate that the user is at the merchant. Appropriate GPS accuracy data may be consulted to determine a suitable threshold distance deemed to be sufficiently proximal to the merchant to be considered to be "at" the merchant. For example, a GPS error might be 30 cm to 30 meters, thus a threshold of 1 meter to 100 meters (allowing for several standard deviations) or less difference in position between the merchant location and the user location may be deemed to be "at" the merchant and allow the transaction, depending on the actual error for the location. If the difference is greater, an error message may be displayed and the transaction canceled. If the GPS error is large, the GPS data alone may not be sufficient to validate that the user and merchant can see one another's displays to visually confirm the transaction code, but may be sufficient to rule out other neighboring merchants and may be sufficient to put a location stamp on the transaction.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 8A and FIG. 8B show the anonymous transfer of physical, digital or fiat currency between two individuals at the same geography location using two mobile devices.

FIG. 8C and FIG. 8D illustrate a peer to peer anonymous cash transfer process.

DETAILED DESCRIPTION

Figure 1:
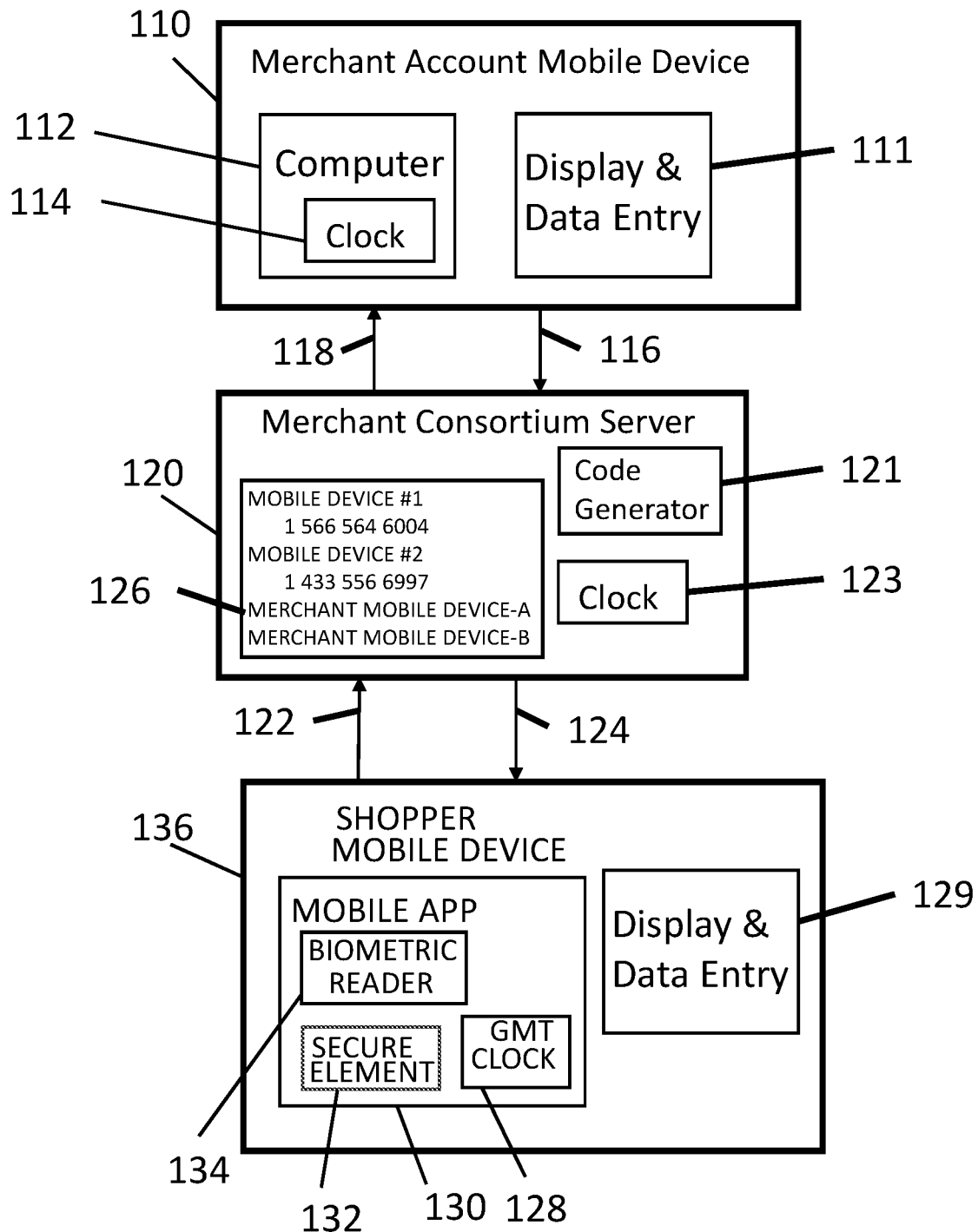
FIG. 1 illustrates an exemplary system for exchanging funds between individuals and merchants utilizing mobile devices.

FIG. 1 illustrates an exemplary system for a shopper utilizing a mobile device to communicate with a merchant mobile device to deposit or withdraw cash.

Referring to FIG. 1, a banking service server 120, e.g. merchant consortium server, is connected to a merchant account mobile device 110 and a shopper mobile device 136 through a secure network interface 116, 118, 122, 124, which may include Internet connectivity and/or cell phone network, and/or telephone network connectivity. The banking server 120 may be one or more network servers or other computing devices capable of the desired functions. The banking service server 120 includes an account database 126 with account and user details for shopper accounts and merchant accounts including names, addresses, phone numbers, account balances, transaction history and other details used in banking. The server also includes a code generator 121 and clock 123 for generating transaction codes. Not shown, the banking server may have connections to member bank computer systems to act as an ATM for bank customers.

The shopper mobile device 136 (alternatively referred to as user device) is connected through secure communications 122, 124 to the banking service server. The user device 136 may be a smart phone, tablet, or other computing device capable of running application software 130 (alternatively referred to as APP or User App) that communicates with the banking server 120. The user device 136 may include a biometric reader 134 or other device to ensure secure identification of the user of the device. Alternatively, passwords, PIN's, or other techniques may be used. The mobile app may include a secure element 132 to generate security codes and services. The user device includes a display 129 and data entry, i.e., user input capability by key entry or voice recognition as provided by the cell phone or tablet. A clock 128 may be provided as necessary for the security algorithms 132 and for time stamping the transactions.

The merchant account mobile device 110 (also referred to as merchant device) may also be a smart phone, tablet, computer, or other device. The merchant device 110 may operate merchant application software (also referred to as merchant APP). The merchant device may also include a computer 112, clock 114, display 111 and data entry for merchant functions similar to the user functions.

Figure 2:
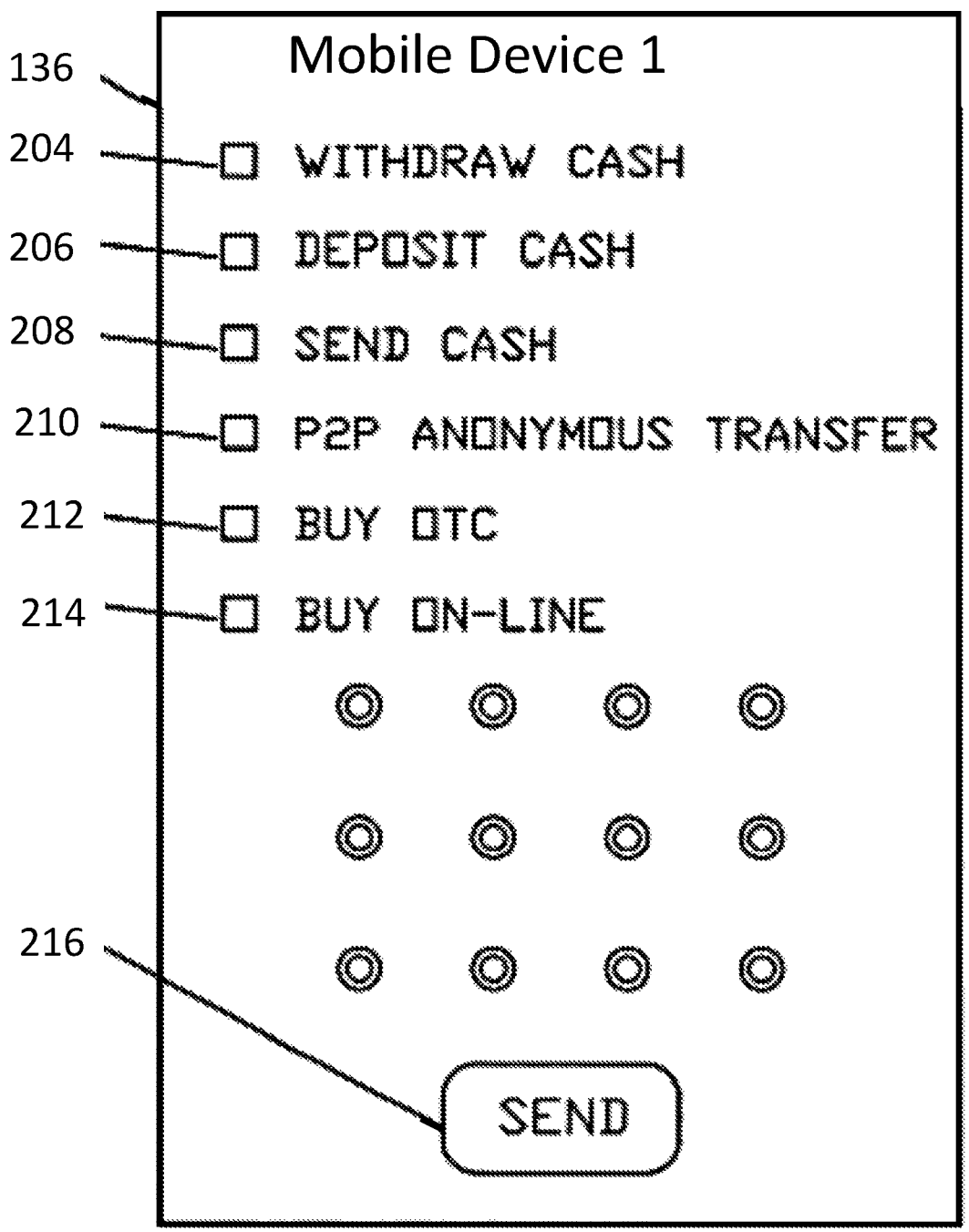
FIG. 2 illustrates an exemplary display of various different transaction options between a merchant and mobile device.

FIG. 2 illustrates an exemplary display of various different transaction options between a merchant and user mobile device. FIG. 2 shows a display on the user device allowing for selection of the type of transaction to be performed. The types of transactions may include:

1) withdraw cash 204,
2) deposit cash 206,
3) send cash 208,
4) anonymous person to person cash transfer while both parties are at the same geography location 210,
4) buy over the counter from merchant 212, and
5) buy on-line from merchant 214.

Upon selecting a function, the user may press the "send" button 216 to initiate the transaction and move to the next screen.

Figure 3:
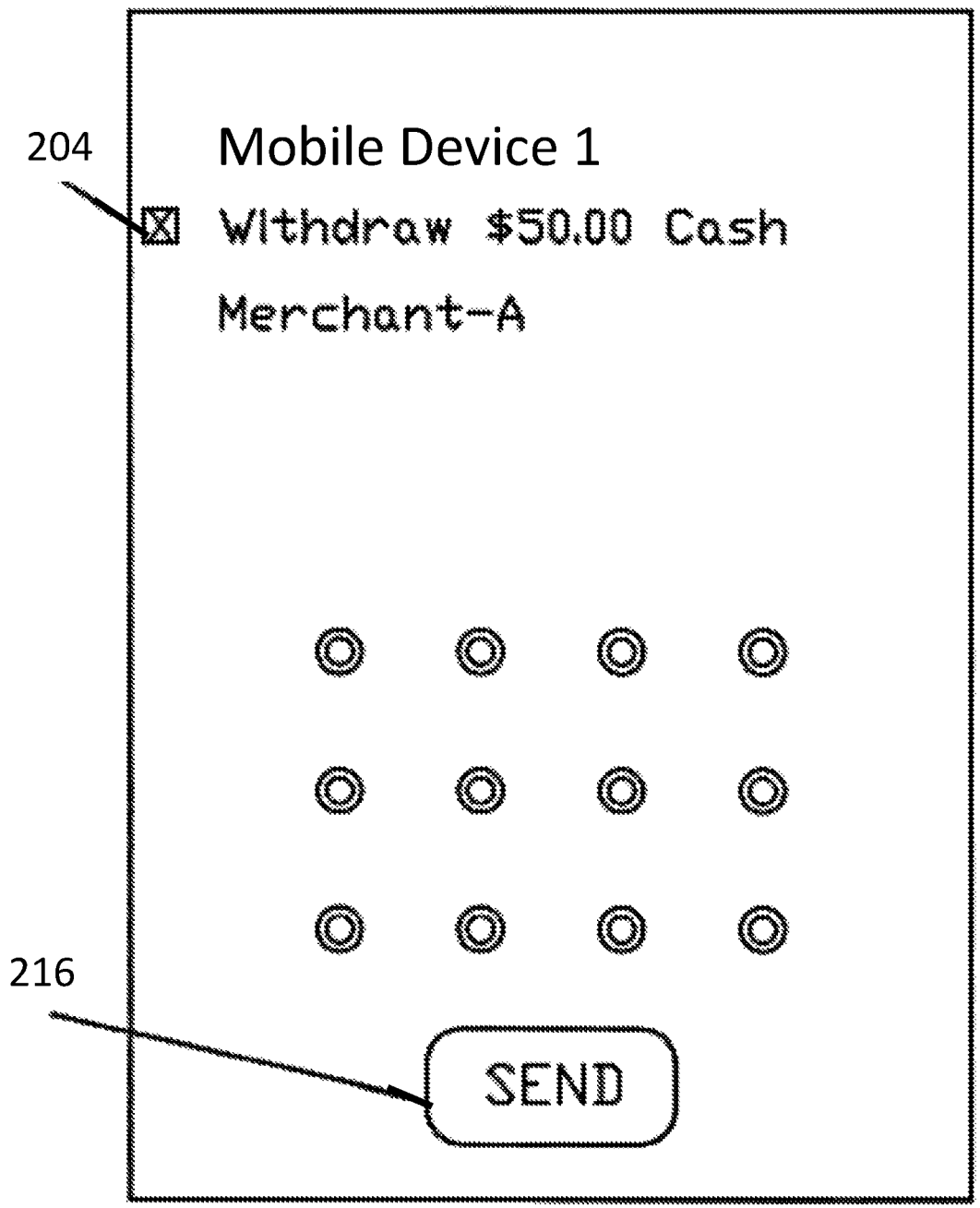
FIG. 3 illustrates an exemplary screen display showing mobile device 1 after selection of the withdraw cash function.

FIG. 3 illustrates an exemplary screen display showing mobile device 1 after selection of the withdraw cash function. The box 204 is checked and an amount of $50.00 is entered by the user, and Merchant-A is determined from location information detected by the mobile device 1 and sent by mobile device 1 to the server. The server then finds the merchant proximal to the mobile device 1 and sends the merchant name for display on the mobile device 1 screen. Pressing the "send" button 216 will begin the process and move to the next screen. The send button is pressed while the user is at the merchant point of sale.

Figure 4:
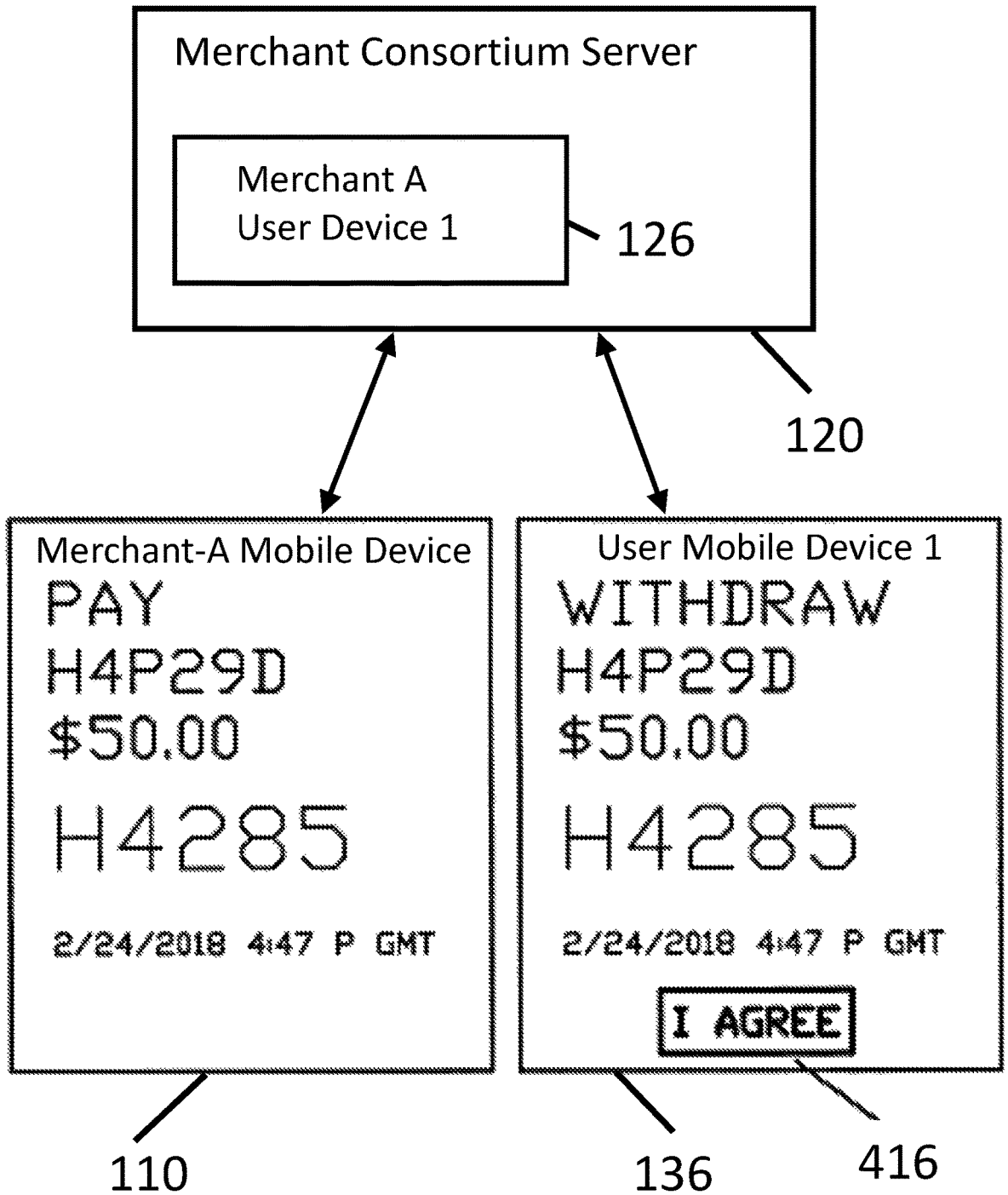
FIG. 4 illustrates an exemplary withdraw cash transaction.

FIG. 4 illustrates an exemplary withdraw cash transaction. FIG. 4 shows an exemplary screen display on the user 1 mobile device and the merchant-A device. The user activates the mobile APP and signs in using the biometric or other sign in. The type of transaction is selected to be "withdraw cash", and the amount is entered as in FIG. 3. The merchant is selected from a list and a merchant code is displayed on both displays—shown as "H4P29D" on both displays. The banking server will then validate the user using a secure protocol and generate and send a one time use, temporary, transaction code to the user and the merchant, shown as H4285 on both displays. The merchant may compare the transaction code and merchant code as well as transaction amount and other information on both the user and merchant displays and approve the transaction. The user may validate the information displayed on the user device 136 and press the "I agree" button 416 on the user device 136 to approve the transaction.

In one embodiment, the transaction code, i.e., temporary user code, may be generated using a time factor and/or a random number factor. For example, the code may be a random number or pseudo-random number. In a further embodiment, the code may be in accordance with FIG. 11 and may be generated using a location factor and a time factor.

In a further optional feature, the merchant attendant may press a special button on the merchant device to receive a new set of transaction numbers. This feature may be used where the dollar amount is unusually large or for other concerns. This feature can be activated by the attendant without the knowledge of the user. The user may also be able to activate the user device to obtain a new set of numbers when requested by the merchant attendant.

Figure 5A:
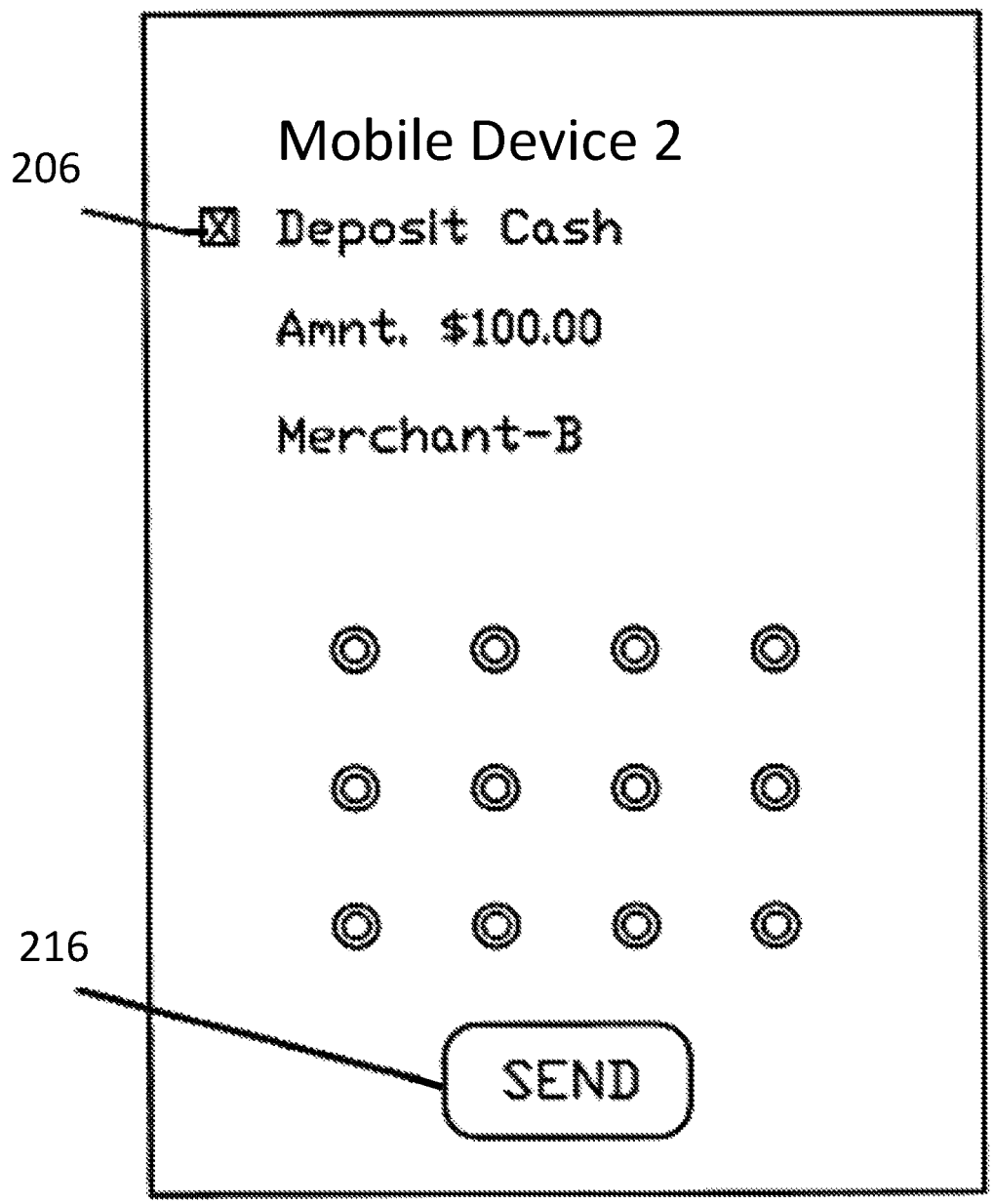
FIG. 5A illustrates an exemplary display of the user mobile device after selecting a cash deposit transaction.

These steps may prevent a second user from stepping in front of the first user.
1] The user places the phones display on the ATM counter facing toward the attendant.
2] The attendant compares the information above displayed on the merchant phone to the user phone, and if there is an exact match, hand the user the cash.
3] The user must press "I Agree" button on the user phone to receive the cash
4] Both phones then show a new balance
5] The user may then exit the store or continue shopping FIG. 5A illustrates an exemplary display of the user mobile device after selecting a cash deposit transaction. As illustrated, a mobile device from a second user is illustrated. A cash deposit is indicated 206 and an amount of $100 is entered and Merchant-B is selected. Pressing the send button 216 initiates the transaction and moves to the next screen.

Figure 5B:
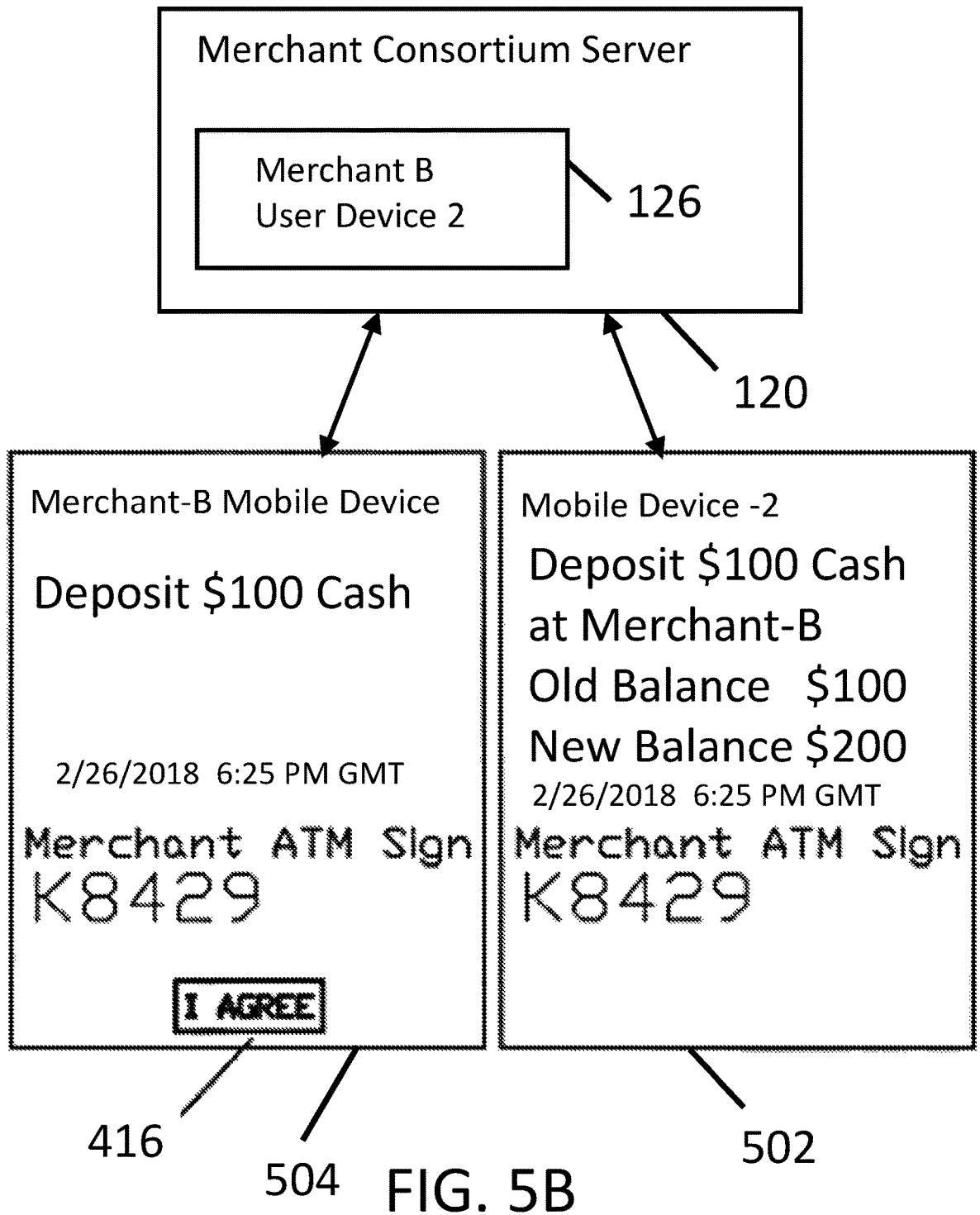
FIG. 5B illustrates an exemplary deposit cash transaction.

FIG. 5B illustrates an exemplary deposit cash transaction. FIG. 5B shows an exemplary screen display on a second user, user 2 mobile device 502 and a second merchant, merchant-B device 504. The user activates the mobile APP and signs in using the biometric or other sign in. The type of transaction is selected to be "deposit cash", and the amount is entered. The merchant is displayed based on location information from the user 2 mobile device and location information of the merchant. The banking server will then validate the user and generate and send a one-time use, temporary, transaction code to the user and the merchant, shown as "K8429" on both displays. The merchant may compare the transaction code as well as transaction amount and other information on both displays and approve the transaction. The merchant may compare the codes and other information on both displays and press the "I agree" button 416 on the merchant B device 504 to approve the transaction.

Locating a Merchant ATM

When traveling, a user may need to find a merchant offering the MATM services. The user may start the application and select "find service". A map 602 may then be displayed showing nearby merchants offering the service.

Figure 6:
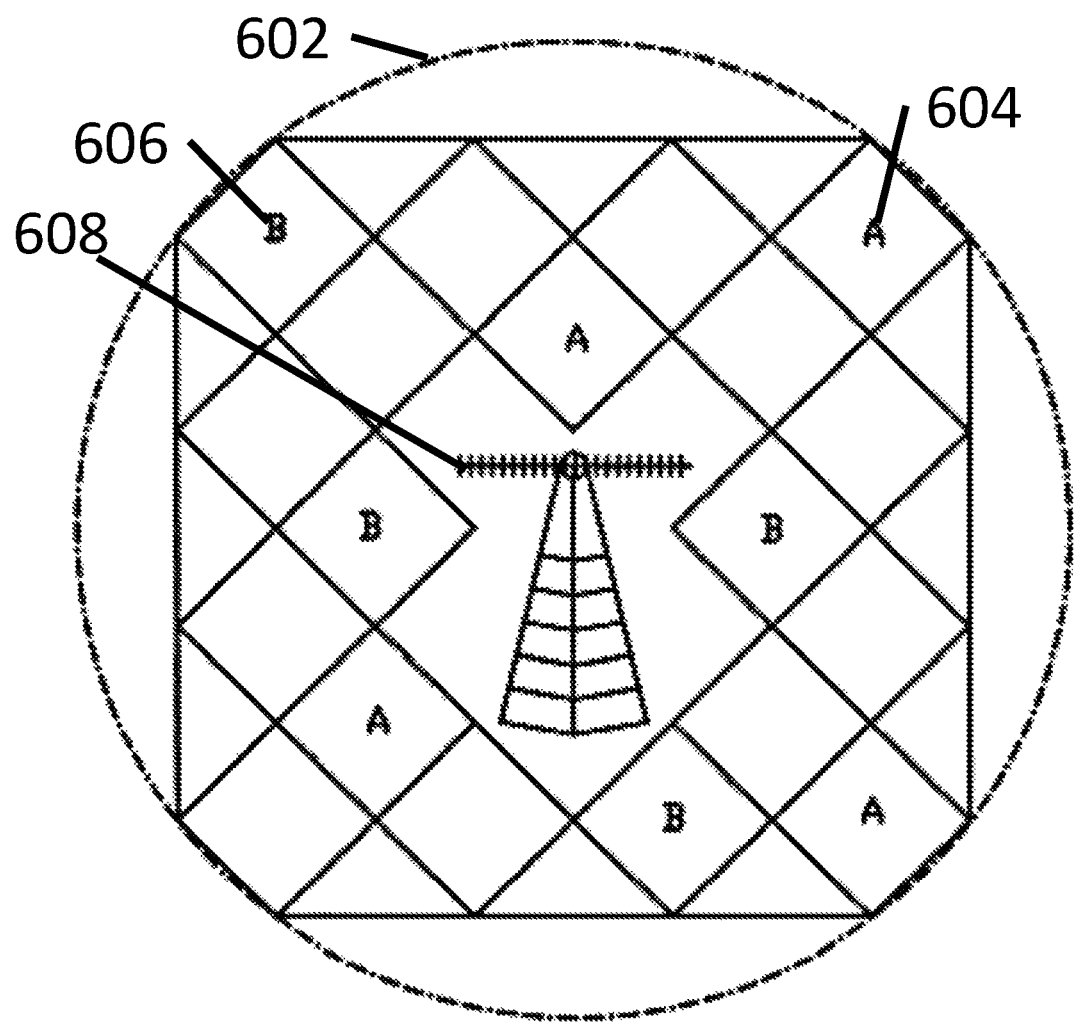
FIG. 6 illustrates a Geo-Location chart showing all merchants proximate a mobile device or mobile tower or other reference.

FIG. 6 illustrates a Geo-Location chart showing all merchants proximate a mobile device or mobile tower 608 or other reference. A merchant code may indicate allowing withdrawal as "A" 604, or allowing deposit as "B" 606 or one or more of the payment options of FIG. 2. The map may include a direction and route to the selected merchant.

The geo location display mode of FIG. 6 may be used to find a merchant open with the desired amount of cash available for withdrawal, since a merchant that just open early in the morning may not have much cash on hand. When searching for a merchant, the dollar amount may be entered and then press the "send" button. The map FIG. 6 will then show a route to that merchant. Transaction information will not yet be displayed on phone, only the map is displayed.

When the user arrives at the merchant's location and within a few meters of the ATM window will the security code, dollar amount, the merchant's ATM number or sign and the GMT date/time stamp be displayed.

Sending a Cash Gift

Figure 7:
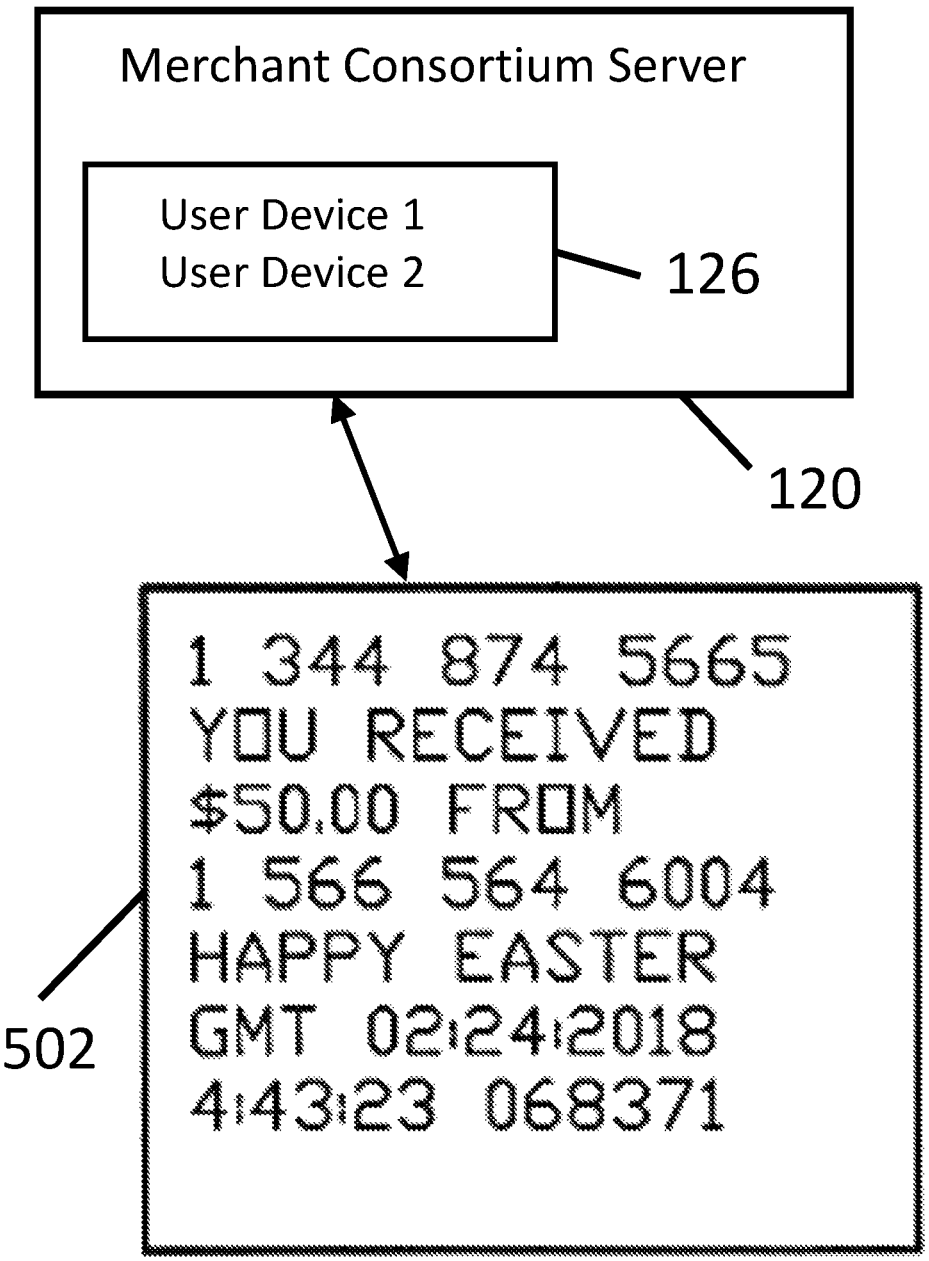
FIG. 7 illustrates the face of a mobile device #2 with note from mobile device #1 showing dollar amount received.
Figure 11:
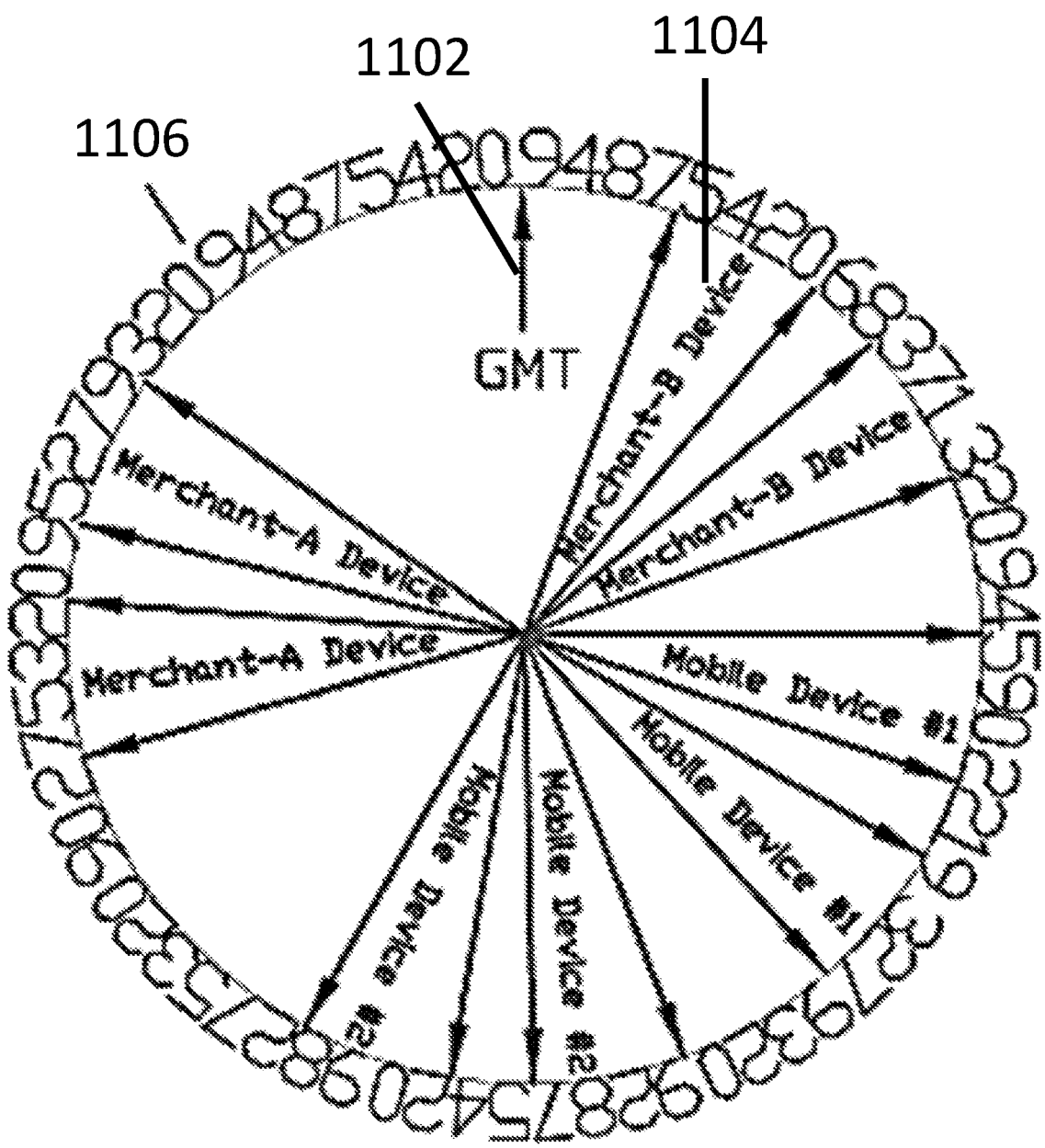
FIG. 11 illustrates an exemplary code generator that may be used to generate transaction codes.

FIG. 7 shows a display resulting from user device 1 having sent a cash gift to user device 2 and including a note from user device 1 (not shown) displayed on mobile device #2 502 with dollar amount and GMT date/time stamp along with the transaction code, e.g., a secret location in the GMT database, as described with respect to FIG. 11. Device #2 may visit any participating merchant to withdraw the funds using only their mobile device phone number and transaction code, e.g., secret location in the GMT database. Alternatively, Device #2 may send the funds to another person.

Peer to Peer Funds Transfer

FIG. 8A and FIG. 8B show the anonymous transfer of physical, digital or fiat currency between two individuals at the same geography location using two mobile devices. Mobile device #1 of FIG. 8A belongs to a first user, and mobile device #2 of FIG. 8B belongs to a second user. The first user and the second user are located in close proximity so that each may read the display of the other. Each user starts the mobile application, which initiates a secure connection with the banking server (e.g., see FIG. 1)

User 1 inputs the dollar amount in Mobile Device #1 136 to transfer to mobile device 2 502. The second user inputs the amount to receive in Device #2. Both mobile device #1 and #2 will display a unique security code, which is based on the respective devices actual phone numbers. The security code displayed on device #1, e.g., "T4W9K2" will be entered into device #2, and the security code on device #2, e.g., "Z6A2N1" will be entered into device #1. Both parties then press the respective send buttons 216. Both mobile devices will then receive a message from the banking service confirming the transaction.

As with the discussion of FIG. 1, the security codes may be based on location and time and valid for a fixed short time interval, for example ten minutes. The banking server may compare mobile phone location information transmitted from each mobile phone to validate that the two mobile devices are in sufficient proximity to allow visual inspection of each other's display, considering location measurement error.

FIG. 8C and FIG. 8D illustrate a peer to peer anonymous cash transfer process. Referring to FIG. 8C and FIG. 8D, the figures show the dollar amount to transfer from device #1 136 to device #2 502, along with a second security code "Z6A2N1", as shown, which confirms the transaction. The user of Device #2 can view the display of Device 1 to validate the Device #2 502 will press "I AGREE" 416 to complete the agreement. As with other transfer modes, the transaction code may be temporary and one time use. The banking server may compare mobile phone location information transmitted from each mobile phone to validate that the two mobile devices are in sufficient proximity to allow visual inspection of each other's display, considering location measurement error.

Over the Counter Purchase

Figure 9:
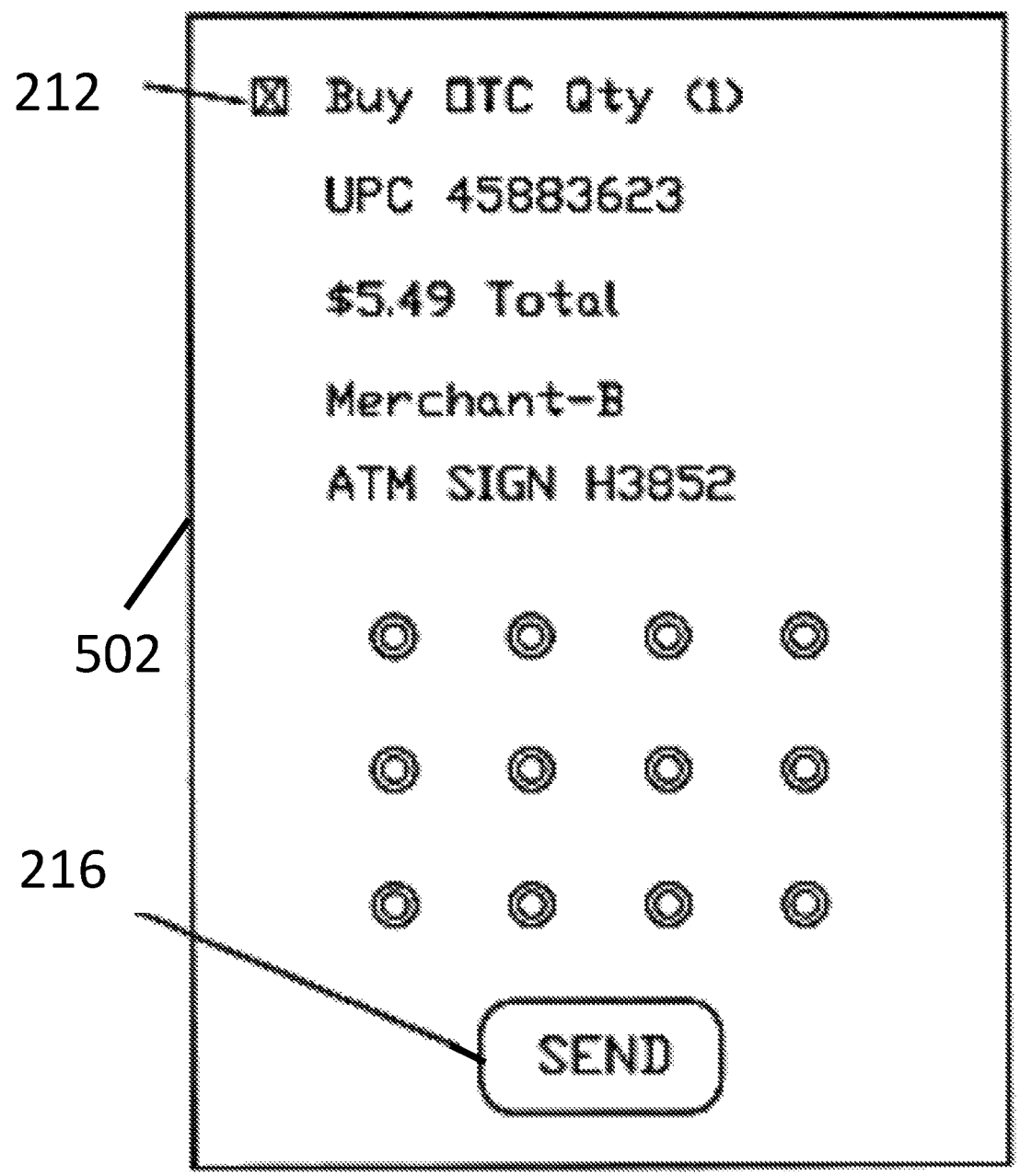
FIG. 9 illustrates a purchase over the counter at a participating merchant by mobile device #2.

FIG. 9 illustrates a purchase over the counter at a participating merchant by mobile device #2. The device, after activation using biometric, will display the merchant ATM sign (code) and the dollar balance at that point in time. The merchant will then confirm the ATM sign on the mobile device #2 matches the merchant ATM sign then ring up all items as usual, then press send on the merchant mobile device or POS (Point of Sale) system. Both mobile devices will receive a receipt showing balance.

In one embodiment, when the user enters the merchant store the user device will automatically detect the location and send location information to the banking server. The server will then create a temporary two digit identification number for the user device and send the two-digit number to both the user device and merchant device.

When the user goes to checkout at the merchant point of sale counter (POS), the user selects the OTC mode 212 on the user device, and the two-digit number will display on the user device. The merchant may have several other numbers displayed on the merchant device so the merchant can press the user number on merchant phone to complete transaction.

The merchant phone may capture each items price and item code from the POS using low energy wireless, for example, Bluetooth®

Over the Counter, Self Checkout

In one embodiment, the shopper may enter a merchant's store and start the application. The application then communicates with the banking server, sending the shopper's geographic location. The location is then matched with a merchant and the Merchant's point of sale identification numbers (checkout counter numbers) are sent to the shopper's mobile device. The shopper may then select the desired isle and point of sale (POS) number (for example, checkout counter number 12). The shopper may select a POS counter where a clerk is present or may select a POS for self checkout, i.e., where a clerk is not present.

The merchant self checkout counter may have a barcode reader operated by the shopper. The barcode reader device may then capture each item and code (barcode) and send the information to the merchant mobile device using a wireless link, for example Bluetooth®. The merchant mobile device then sends the information and total to the banking server, where the total is added to the merchant's account and debited from the shopper's account. Thus, the transaction is accomplished without participation from the merchant.

Buy Online

Figure 10:
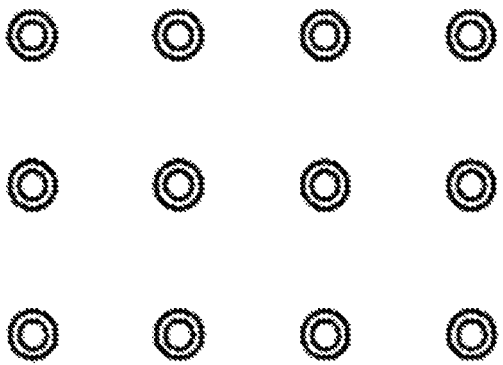
FIG. 10 illustrates an exemplary screen of a mobile device with "Buy Online" selected.

FIG. 10 illustrates an exemplary screen of a mobile device with "Buy Online" selected. After activating the mobile device using biometric 134, a buy online mode is selected 214 and an item is selected for purchase. A security code location "9287" and "2098", for example on FIG. 11, 1106 is determined and displayed. The codes are provided so that the merchant may later receive funds for the order. The price and shipping method may then be agreed to and then the order may be placed by pressing the send button 216 on mobile device #2, 502. The merchant may be required to wait until the shipping company provides evidence of delivery before receiving funds.

The item and price are entered. The merchant name and ID are entered. The banking service records the date, time, and location of the mobile device and generates a transaction ID code.

In one embodiment, after selecting one or more items the user may press the checkout button on the user phone. The dollar amount will be placed in a merchant escrow account to prevent double spending. After the banking service receives a delivery receipt from FedEx® UPS® or other delivery companies, the money will be moved to the merchant account.

FIG. 11 illustrates an exemplary code generator that may be used to generate transaction codes. Other code techniques and random number generators may alternatively be used. FIG. 11 illustrates a 24 hour clock face with midnight GMT (Greenwich Mean Time) 1102 at the top. The hours and minutes are not shown, instead time points 1104 are shown relating to transactions. Each transaction includes a time stamp with hour and minute that may be used to access the random number wheel 1106 to obtain a transaction code. The outer ring represents the random number wheel 1106 or ring associated with each minute in time around the clock.

Referring to FIG. 11, FIG. 11 illustrates a Greenwich Mean Time (GMT) clock database, which holds a date—time stamp including minute, day, month and year for each mobile device in the banking service database. The database can verify a unique location of each mobile device in the banking account database for each transaction held in a secure element. The pointer location for each user in the database may change after some time elapse or after each transaction, and may change clockwise or counter-clockwise. Thus, the random code for each transaction may change as a function of time.

In one embodiment, the clock of FIG. 11 represents a 24 hour GMT time clock. Each transaction is given a position on the 24 hour clock at the time of the transaction. The outer band of numbers 1106 is a set of random numbers pointed to by the time stamp 1104 of each transaction. Thus, a random number code corresponding to each transaction is the random number corresponding to that time slot in the code generator. The random number ring 1106 may rotate relative to the time clock 1102 and time stamps 1104 so that the corresponding code for a given transaction changes with time. The random number ring 1106 may rotate periodically, for example each ten minutes, or other time interval as desired. The ring may rotate at random intervals. The ring may rotate clockwise or counter-clockwise as desired or randomly in direction. The history of rotation may be recorded so as to be able to determine historical codes for each transaction as may become necessary.

In one exemplary embodiment the random number ring may have 1440 random numbers, one for each minute in 24 hours. The ring may rotate periodically for some period of time, for example one day or one week, at which time the random numbers may be replaced with a new set of random numbers. Note that each of the random numbers may also be referred to as random values may be, for example, ten digits including numeric and alpha mixed characters. The term "random number" includes pseudo random numbers and values and computer generated numbers and values.

So, for example, if A is an array of random numbers representing the ring, A might be indexed from 0 to 1439, having 1440 random values. The code may be found by selecting the A array value based on the time stamp, i.e., an index, I, may be the hour×60 plus the minute, such that A(I) is the selected code value. Periodically, the code selection may be rotated by adding a shift factor, S. S may be added to the index in a modulo 1440 manner, thus:

$$Code = A(Mod(I+S)),$$

where Mod is the modulo 1440 operation.

All aspects of the code generator including the contents of the random ring and position history of the random ring and any new reconfiguration of the random ring are maintained by the banking service server in secret, not publicly disclosed. Although the time stamp for a given transaction may be known by the participants of the transaction, the corresponding code changes in a short time so that the old code will be useless for future transactions thereby foiling attempts at fraudulent transactions.

Figure 12:
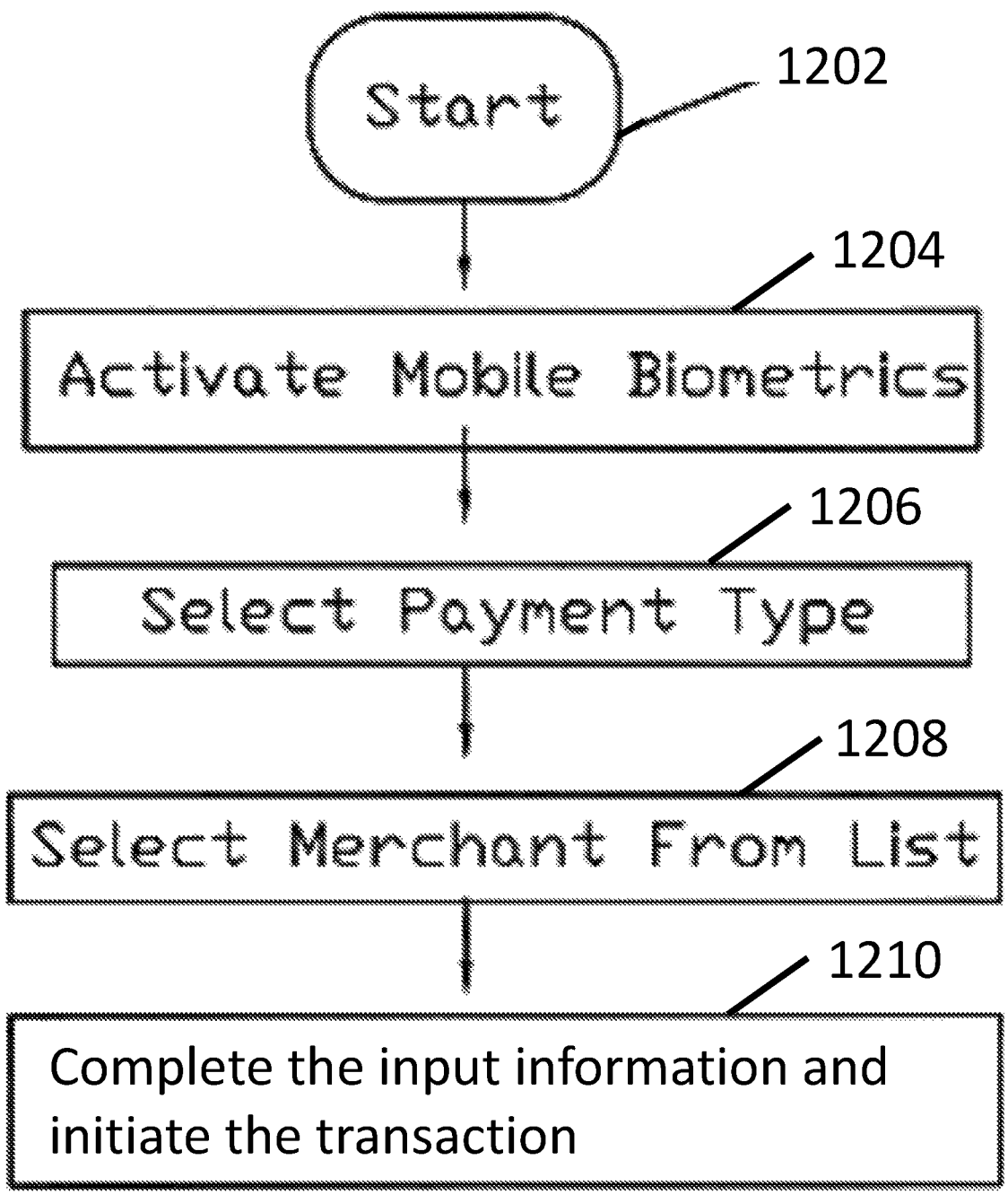
FIG. 12 illustrates an exemplary process for completing a transaction.

FIG. 12 illustrates an exemplary process for completing a transaction. Referring to FIG. 12, the user initiates the process 1202 by activating the mobile biometric sensor 1204 to securely activate the mobile application. The user then is presented with the menu of transaction types and selects a payment type 1206. The user is then presented with a selection of valid merchants with in the valid range for the option chosen and the user selects the desired merchant 1208. The user then completes the appropriate screen as presented by the application 1210.

CONCLUSION

The capabilities of the present invention can be implemented in software, firmware, hardware, or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture such as a watch or bracelet can be included as a part of a computer system or sold separately. Additionally, at least one program storage device readable by a machine, tangibly embodying at least one program of instructions executable by the machine to perform the capabilities of the present invention can be provided.

The flow diagrams depicted herein are exemplary. There may be many variations to these diagrams or the steps (or operations) described therein without departing from the spirit of the invention. For instance, the steps may be performed in a differing order, or steps may be added, deleted, or modified. All these variations are considered a part of the claimed invention.

While embodiments of the invention have been described, it will be understood, however, that the invention is not limited thereto, since modifications may be made by those skilled in the art, particularly considering the foregoing teachings. It is, therefore, contemplated by the appended claims to cover any such modifications that incorporate those features or those improvements that embody the spirit and scope of the present invention.

| Reference Number Table | |
|---|---|
| Reference | Feature |
| 110 | Merchant mobile device |
| 111 | Merchant device display and data entry |
| 112 | Merchant device computer |
| 114 | Merchant device clock |
| 116 | Secure data link merchant to server |
| 118 | Secure data link server to merchant |
| 120 | Merchant consortium server |
| 121 | Server code generator |
| 122 | Secure data link user to server |
| 123 | Server clock |
| 124 | Secure data link server to user |
| 126 | Server data base |
| 128 | User clock |
| 129 | User display and data entry |
| 130 | User mobile application |
| 132 | User security feature |
| 134 | User biometric reader |
| 136 | Mobile device 1, shopper (user) device |
| 204 | Withdraw cash function selection |
| 206 | Deposit cash function selection |
| 208 | Send cash function selection |
| 210 | P2P anonymous transfer function selection |
| 212 | Buy OTC function selection |
| 214 | Buy on-line function selection |
| 216 | Mobile "send" control |
| 416 | Mobile "I agree" control (button) |
| 502 | Mobile device 2 (user 2) |
| 504 | Merchant B mobile device |
| 602 | Map view area |
| 604 | Merchant A |
| 606 | Merchant B |
| 608 | Cell tower or other map reference |
| 1102 | GMT time clock |
| 1104 | Time stamp location on clock |
| 1106 | Rotating random number ring |
| 1202 | Start |
| 1204 | Activate mobile biometrics |
| 1206 | Select payment type |
| 1208 | Select merchant from list |
| 1210 | Complete and initiate transaction |

What is claimed is:

1. A system for completing a cash transaction comprising:
a user device having a user application installed;
a merchant device having a merchant application installed;
a banking service server connecting a user account to said user device using a first secure connection over a network, and said banking service server connecting a merchant account to said merchant device using a second secure connection over said network;
said first smart phone computing device configured for receiving a transaction amount and a merchant identification entered or selected by a user; said user device receiving location information of said user device from a location information source; said user device configured for sending said transaction amount, said merchant identification and said location information to said banking service server over said first secure connection;
said banking service server receiving said transaction amount, said merchant identification and said location information from said first smart phone computing device; said banking service server validating that the user device and merchant device are in sufficient proximity for the merchant or the user to concurrently observe the user device and the merchant device;
said banking service server generating a temporary validation code for the transaction;
said banking service server connecting with said merchant device over said second secure merchant connection and sending prospective transaction information including said transaction amount, and said temporary validation code to said merchant device;
said banking service server sending said temporary validation code to said user device for display;
said merchant device displaying said transaction amount, and said temporary validation code;
wherein, when the transaction is a deposit cash transaction,
said banking service server configured for receiving a message from said merchant device responsive to merchant input indicative that the temporary validation code displayed on the merchant device and the temporary validation code displayed on the user device are the same and that the transaction is approved; said merchant input being a single operation without entry of the temporary validation code;
wherein, when the transaction is a withdraw cash transaction,
said banking service server configured for receiving a message from said user device responsive to user input indicative that the temporary validation code displayed on the merchant computing device and the temporary validation code displayed on the user device are the same and that the transaction is approved; said user input being a single operation without entry of the temporary validation code;
said banking service server updating the user account and merchant account in response to the message that the temporary validation codes displayed are the same and that the transaction is approved;
wherein there is no direct communications between said user device and said merchant device.

2. The system of claim 1, wherein the location information is based on a satellite based location network.

3. The system of claim 1, wherein the transaction is a cash deposit transaction and the user provides cash to the merchant corresponding to merchant funds being transferred from the merchant account to the user account.

4. The system of claim 1, wherein the transaction is a cash withdrawal transaction and the user receives cash from the merchant corresponding to funds transferred from the user account to the merchant account.

5. The system of claim 1, further including a map display showing nearby merchants and indicating cash withdraw and deposit capability.

6. The system of claim 1, wherein the temporary transaction code is a short code having a length of nine characters or less.

7. The system of claim 6, wherein the temporary transaction code has a length of four characters or less.

8. The system of claim 1, wherein the temporary transaction code is valid for ten minutes and invalid thereafter.

9. The system of claim 1, wherein the temporary transaction code is valid for thirty minutes and invalid thereafter.

10. The system in accordance with claim 1, wherein the merchant identification is a code.

11. A method for completing a cash transaction comprising:
establishing a user account with a user and connecting said user account to a server;
establishing a merchant account with a merchant and connecting said merchant account to said server;
connecting said server with a user device of said user having said user account by a first secure connection;

connecting said server with a merchant device by a second secure connection, said merchant device controlled by the merchant of said merchant account;

receiving by said server from said user device a transaction type, merchant selection, and transaction amount; and user device location information;

validating, by said server, that the user device and merchant device are in sufficient proximity for the merchant or the user to concurrently observe the user device and the merchant device;

generating, by said server, a temporary transaction code having a time period of validity;

sending, by said server, the temporary transaction code and transaction details from said server to the merchant device for display on the merchant device;

sending the temporary transaction code from the server to the user device for display on the user device;

receiving, by said server, a confirmation that the merchant or the user observed the user device and the merchant device and verified that the temporary transaction code displayed on the user device is the same as the temporary transaction code displayed on the merchant device and that the transaction is approved, without entry of said transaction code by said merchant or the user; wherein there is no direct communications between said user device and said merchant device;

upon receiving said confirmation within the time period of validity of said temporary transaction code at said server, said server updating the user account and merchant account to reflect the transaction amount; and sending, from said server, a confirmation of the transaction to said user device and said merchant device;

wherein the transaction type is a user deposit transaction, wherein the user provides said transaction amount of cash to the merchant and the transaction amount is transferred from the merchant account to the user account.

12. The method in accordance with claim 11, wherein the temporary transaction code validity time is for no more than ten minutes.

13. The method in accordance with claim 11, wherein the transaction code is generated based on a 24 hour GMT time clock and a set of random values associated with each time of the time clock and the transaction code is derived based on the time of a time stamp associated with the transaction; said time stamp pointing to a particular random value of the set of random values; said transaction code based on the particular random value.

14. The method in accordance with claim 11, wherein the user and merchant are not required to exchange identity information, thereby remaining anonymous to one another.

15. The method in accordance with claim 14, further including the server validating that the user device and merchant device are proximal within three meters.

* * * * *